(12) United States Patent
Lupton et al.

(10) Patent No.: US 6,400,482 B1
(45) Date of Patent: Jun. 4, 2002

(54) COMMUNICATION SYSTEM

(75) Inventors: Elmer C. Lupton, Charlestown; Steven B. Leeb, Belmont; George B. Hovorka, Rockport, all of MA (US); Deron Jackson, San Jose, CA (US); Billie L. Bentzen, Berlin, MA (US)

(73) Assignee: Talking Lights, LLC, Boston, MA (US)

( * ) Notice: Subject to any disclaimer, the term of this patent is extended or adjusted under 35 U.S.C. 154(b) by 0 days.

(21) Appl. No.: 09/291,709

(22) Filed: Apr. 14, 1999

Related U.S. Application Data
(60) Provisional application No. 60/081,866, filed on Apr. 15, 1998, provisional application No. 60/108,287, filed on Nov. 13, 1998, and provisional application No. 60/115,374, filed on Jan. 11, 1999.

(51) Int. Cl.[7] .............................................. H04B 10/10
(52) U.S. Cl. ...................... 359/154; 359/142; 359/144
(58) Field of Search ................................ 359/141, 142, 359/144, 154, 145

(56) References Cited

U.S. PATENT DOCUMENTS

| | | | | |
|---|---|---|---|---|
| 3,351,901 A | * | 11/1967 | Padberg, Jr. ................ | 359/141 |
| 3,900,404 A | | 8/1975 | Dachs ......................... | 250/199 |
| 4,199,261 A | | 4/1980 | Tidd et al. ................... | 356/448 |
| 4,493,114 A | | 1/1985 | Geller et al. ................. | 455/617 |
| 4,540,243 A | | 9/1985 | Fergason ..................... | 350/337 |
| 4,996,719 A | * | 2/1991 | Okazaki et al. ............. | 359/144 |
| 5,020,155 A | | 5/1991 | Griffin et al. ................ | 455/617 |
| 5,424,859 A | | 6/1995 | Uehara et al. ............... | 359/152 |
| 5,550,434 A | * | 8/1996 | King et al. .................. | 315/160 |
| 5,608,723 A | * | 3/1997 | Felsenstein ................. | 370/335 |
| 5,616,901 A | | 4/1997 | Crandall ..................... | 235/379 |
| 5,623,358 A | | 4/1997 | Madey ........................ | 359/172 |
| 5,635,915 A | | 6/1997 | Gray ..................... | 340/825.57 |
| 5,657,145 A | | 8/1997 | Smith ......................... | 359/181 |
| 5,687,136 A | | 11/1997 | Borenstein ................. | 367/116 |
| 5,757,530 A | | 5/1998 | Crandall, Jr. ............... | 359/182 |
| 5,982,520 A | * | 11/1999 | Weiser et al. ............... | 359/172 |
| 5,986,786 A | * | 11/1999 | Crandall, Jr. et al. ....... | 359/154 |

FOREIGN PATENT DOCUMENTS

| JP | 60-32443 | 8/1983 |
|---|---|---|
| WO | WO 95/11558 | 4/1995 |

OTHER PUBLICATIONS

Wilkins, et al. "Fluorescent lighting, headaches and eyestrain," Lighting Res. Technol., vol. 21(1); pp. 11–18 (1989).
Buffaloe "Fluorescent Lamp Optical Communication Scheme," MIT Dept. of Electrical Engineering & Computer Science, Thesis, pp. 1–49, May 28, 1996.
Buffaloe, et al. "Fiat Lux: A Fluorescent Lamp Transceiver," MIT Paper, Feb. 1997.
Jackson, et al. "Fiat Lux: A Fluorescent Lamp Transceiver," IEEE Transactions on Industry Applications, vol. 34, No. 3, pp. 625–630, May/Jun. 1998.
Light Beam Communicator advertisement, Ramsey Electronics, Inc., Feb. 11, 1999.

\* cited by examiner

*Primary Examiner*—Leslie Pascal
(74) *Attorney, Agent, or Firm*—Choate, Hall & Stewart

(57) ABSTRACT

A communications network comprised of a source of information to be transmitted in the form of a signal, one or more transmitters which emit light suitable for illumination and including means for modulating the light with the information signal, a medium such as a fluid through which the light passes, and one or more receivers for receiving the light and demodulating the signal to obtain the information. A user for the information may be a device, such as a computer or a compact disk player, or it may be a person, perhaps with some form of sensory or mental impairment. The information may be encrypted, may provide directional guidance, such as to a user moving in a vehicle, and/or may be transmitted simultaneously over multiple channels. Various types of visible light assemblies may be employed, with varying power inputs and outputs.

66 Claims, 6 Drawing Sheets

COMMUNICATION SYSTEM

CROSS REFERENCE TO RELATED APPLICATIONS

This application is related to, and claims priority from, U.S. Provisional Patent Application Nos. 60/081,866 filed Apr. 15, 1998, 60/108,287 filed Nov. 13, 1998 and 60/115,374 filed on Jan. 11, 1999, all of which are now abandoned.

BACKGROUND OF THE INVENTION

A communication network is a means for conveying information from one place to another. The information can be in audio, digital data, video, text, graphics, data, sign language or other forms. The network can be a wide area network such as an intranet in an office, store or factory. Establishing and maintaining communication networks is one of the oldest known activities of mankind ranging from the shouting and drum signals of prehistory through written messages, signal flags, signal fires, smoke signals, signal mirrors, heliographs, signal lanterns, telegraphs, radios, telephones, televisions, microwave signals, linked computers and the internet. Improving communication networks will continue to be a major technical focus in the future.

The ideal communication network would be non-intrusive, inexpensive, extremely large information carrying capability (wide bandwidth), instantaneous and suitable for use with a broad variety of transmission and reception technologies.

There have been a few reports of the use of visible lighting as a carrier in electronic communication networks. The earliest reference to using lighting to send electronic information as well as to provide illumination appears to be Dachs (U.S. Pat. No. 3,900,404) disclosing an analog amplitude-modulation (AM) scheme to modulate the arc current in a fluorescent lamp, the "carrier" signal, with an audio information signal. King, Zawiski and Yokoun (U.S. Pat. No. 5,550,434) disclosed an updated electronic circuit that also provides for AM modulation of the arc current with an analog signal. Smith (U.S. Pat. No. 5,657,145) teaches a method for encoding low-bandwidth digital information into the lamp light using a pulsed AM technique. The encoding technique involves chopping 100 microsecond slices of current out of the arc waveform. Nakada ( Japanese Patent application 60-32443, Feb. 19, 1985.)reports a FM modulation and a frequency shift keying (FSK) scheme to transmit digital data using visible lighting. Gray (U.S. Pat. No. 5,635,915 Jun. 3, 1997 and PCT WO90/13067, Oct. 11, 1991.) has reported a product pricing system for supermarket shelf labels where a signal is sent from visible lighting to individual product price labels on shelves to cause the listed prices to change when desired.

Other communication schemes have been proposed that do not use the lamp light as the carrier, but instead use the lamp fixture as an antenna for transmitting conventional radio wave or microwave signals. In Uehara and Kagoshima (U.S. Pat. No. 5,424,859), for example, the inventors disclose techniques for mounting a microwave antenna on the glass surface of fluorescent and incandescent lamps. Buffaloe, Jackson, Leeb, Schlecht, and Leeb, ( "Fiat Lux: A Fluorescent Lamp Transceiver," Applied Power Electronics Conference, Atlanta, Ga. 1997) first outlined the possibility of using pulse-code modulation to transmit data with a fluorescent lamp. In the latter reference, a three-level code shifts the arc frequency to one of three possibilities every Tsw=2 milliseconds. The result is a steady light output, on average, with no perceptible flicker. A one or a zero bit does not correspond to a particular arc frequency, but rather, to a three level pattern in arc frequency. A logic zero bit is transmitted by varying the arc frequency first to 40 kHz, then to 38 kHz, and finally to 36 kHz. A logic one bit is transmitted by the arc frequency pattern beginning with 38 kHz, followed by 40 kHz, and ending with 36 kHz. A unique start bit, used to demarcate the beginning of a transmitted byte, is represented by a sequence in the arc frequency beginning with 36 kHz, followed by 38 kHz, and ending with 36 kHz.

In our previously filed patent applications Ser. No. 09/291,706 filed Apr. 14, 1999 and entitled "Dual-Use Electronic Transceiver Set for Wireless Data Networks" and application Ser. No. 07/292,126 filed Apr. 14, 1999 entitled "Analog and Digital Electronic Receivers for Dual-Use Wireless Data Networks", we have disclosed visible light communications networks for analog and digital data based on frequency modulation of light. The modulation techniques include direct FM, 2 level half weight bit coding and other orthogonal bit coding schemes.

The visible light case mentioned above is a specific case of our invention which, stated generally, involves simultaneous intentional dual use of transmitted electromagnetic radiation for two completely different useful purposes.

SUMMARY OF THE INVENTION

With the new technology disclosed in our previously filed applications, the recent advances in computer technology and other improvements in electronics, a number of applications and uses are now enabled. These applications are most preferentially executed using our new technology. However, in some cases, they may be executed using some of the other technologies known in the prior art.

With reference to FIG. 4, our communication network contains the following elements in series:

a) A source (50) of the information which will be transmitted;

b) A transmitter (54), which includes lamp and a means for controlling the modulation of the lamp to cause the lamp to carry a signal;

c) A medium (56) through which the light passes from the transmitter to the receiver (60, 76 or 108);

d) A receiver for receiving and demodulating the light in order to obtain the information; and e) A user (62, 96 or 98) for the information. This user can be a device, like a computer or a compact disk player, or it can be a person.

Our invention embodies a number of uses and purposes for the light based communication network. One purpose is to process the signal from the light is by the receiver to control the selection of information from a computer memory, CD or other storage device for large scale storage of data, greatly increasing the effective bandwidth of the information which can be transmitted. Another purpose is to provide data to the user from the receiver from both a large scale data storage device, like a computer memory, compact disk or other such device, and from the information transmitted by the light, with segments of data from the sources interspersed in presentation to the user. Another purpose is to provide data from a device source, like a computer chip, a tape cassette a compact disk or other such device, to the transmitter. Another purpose is to repeat continually the data from the device source, providing a continuous signal of finite period to the user. Another purpose is to use two or more transmitting lights, each transmitting its own signal at the same frequency to provide spatial resolution of signal so that the receiver will receive and provide to the user information from only one of the lights at any time and the receiver may shift its reception from one light to another. Another purpose is to transmit two or more different signals simultaneously at different frequencies from one light in such a manner that two or more receivers can each pick up the different signals. Another purpose is to transmit two or more different signals containing the same information in two or more different languages or codes so that by selecting the proper frequency, the user can select information in the language or code they deem most suitable. Another purpose is to encrypt the information prior to transmission and decrypted it subsequent to receipt. Another purpose is to use the lighting of an individual exhibit to provide to the user a description of some aspect of the exhibit. Another purpose is to transmit information over the network is used to provide assistance to individuals who are visually impaired. Another purpose is to transmit information transmitted over the network to provide assistance to individuals who are hearing impaired. Another purpose is to transmit over the network to provide assistance to individuals who are mentally impaired. Another purpose is to transmit the information transmitted over the network for processing by the user and subsequent sending out of a responding signal by the user using some means. Another purpose is to use the network to provide information to a receiver and user which are moving. Another purpose is to use the network to provide information inside an aircraft, boat, submarine, bus, auto, train or other vehicle. Another purpose is to use the network to provide guidance information to a receiver and user which are moving. Another purpose is to use the network to provide safety or warning information. Another purpose is to use create a network where the same information is being provided by a plurality of different lights. Another purpose is to use the network to provide paging information to the user. Another purpose is to provide information in classrooms and other meeting rooms. Another purpose is to create a repeater network where the modulated signal initiated by one light will be received by an adjoining light, that light started modulating, etc. until all lighting in a network is being modulated and carrying the signal. Another purpose is to create a network in which the electromagnetic radiation which is modulated is infrared radiation. Another purpose is to create a network in which the electromagnetic radiation which is modulated is ultraviolet radiation. Another purpose is to create a network in which the electromagnetic radiation which is modulated is radio frequency radiation. Another purpose is to create a network in which the electromagnetic radiation which is modulated is microwave radiation. Another purpose is to create a network in which the electromagnetic radiation which is modulated is X-ray radiation. Another purpose is to create a network to transmit compressed data.

DESCRIPTION OF THE PREFERRED EMBODIMENT

A Computer as a User

One important application for our communication network involves inputting data into a computer. In one usage of this approach, light can be used as a positional locator or a data source. One such device which would use light provided digital data we will refer to as a Personal Locator and Minder or PLAM. In this system, each modulated light will deliver a relatively simple unique signal. This signal could either be a random signal which is uniquely assigned to that light, or else could be based on some kind of geographical matrix. The Personal Locator and Minder will receive the signal from the nearest modulated light, identify the location of that light from information in its memory, compare the location of that light with the location the PLAM is scheduled to be at that particular moment, and then carry out appropriate actions in accordance with its preprogramming. This aspect has application to patients in a hospital or assisted care facility context.

Since each patient has their own PLAM programmed with their own schedule, the system can accommodate as many different patients simultaneously as is desired. Each light will be continuously communicating location. The individual patient's PLAM will be reading this location information and then giving the individualized guidance to the patient.

The second programming feature which can be included in the PLAM will be the ability to record the daily activities and mobility of a patient. In addition to providing and cueing a personal schedule for a patient, the PLAM can also record how many warnings or inconsistencies in schedule versus actual location occurred during the course of an arbitrary time interval. This information could be stored in the PLAM and downloaded when convenient giving a unique and highly detailed record of a patient's mobility and awareness at every location and time during a day.

Another important application for the computer as user will involve the use of an addressable electronic memory device. This device can be a RAM type device, ROM computer memory or storage device like a CD. The addresses can be partially or totally selected based on information provided over modulated lights. The information from the memory can then be used for any of the purposes well known in the art.

Figure 3:
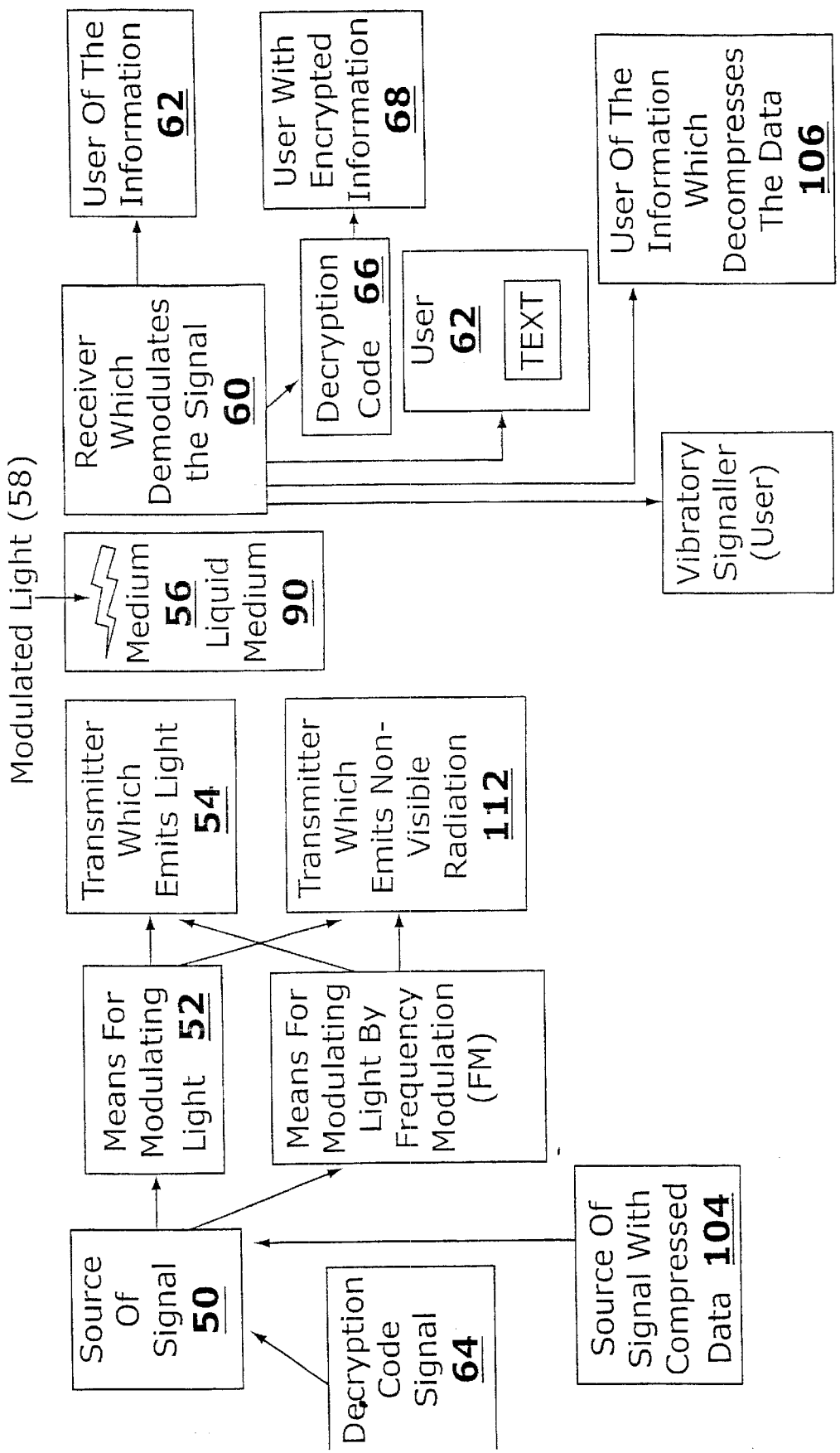
FIG. 3 is a schematic representing the relationship among various elements that may comprise the communication network of the present invention.

Still another application for the computer as user involves the decryption of an encrypted message. As illustrated in FIG. 3, the message is encrypted using a method known in the prior art for which there is a decryption key 64. The key 64 is not provided to the user 68 and is not retained in the computer. The decryption key 64 is supplied continually over the modulated lights. Only when the lights are providing the key 64 can the user 68 decode the information. The security code can be varied in a timed fashion or some other method known in the art. This providing of the decryption code 66 by the lights will provide an additional level of security since only when the user is in the physical presence of the lights will the encrypted message be able to be decoded.

The most general statement of our invention is that it involves simultaneous intentional dual use of transmitted electromagnetic radiation for two or more functionally different useful purposes. An example of such a dual use of electromagnetic radiation other than visible radiation would involve the frequency modulation of a radar signal used to track civilian aircraft so that it also would carry audio information to the aircrew. Another such example would involve the modulation of an infrared illuminator used to allow night vision goggles to be used so that the operator of the illuminator could communicate with the wearer of the night vision goggles or with another user in the field of vision of the infrared illuminator. One preferred embodiment of this invention in electromagnetic wavelength ranges outside the visible is in the infrared wavelength range, another preferred embodiment is in the ultraviolet wavelength range, another preferred embodiment is in the X-ray wavelength range, another is in the radio wavelength range, another is in the microwave wavelength range.

Figure 6:
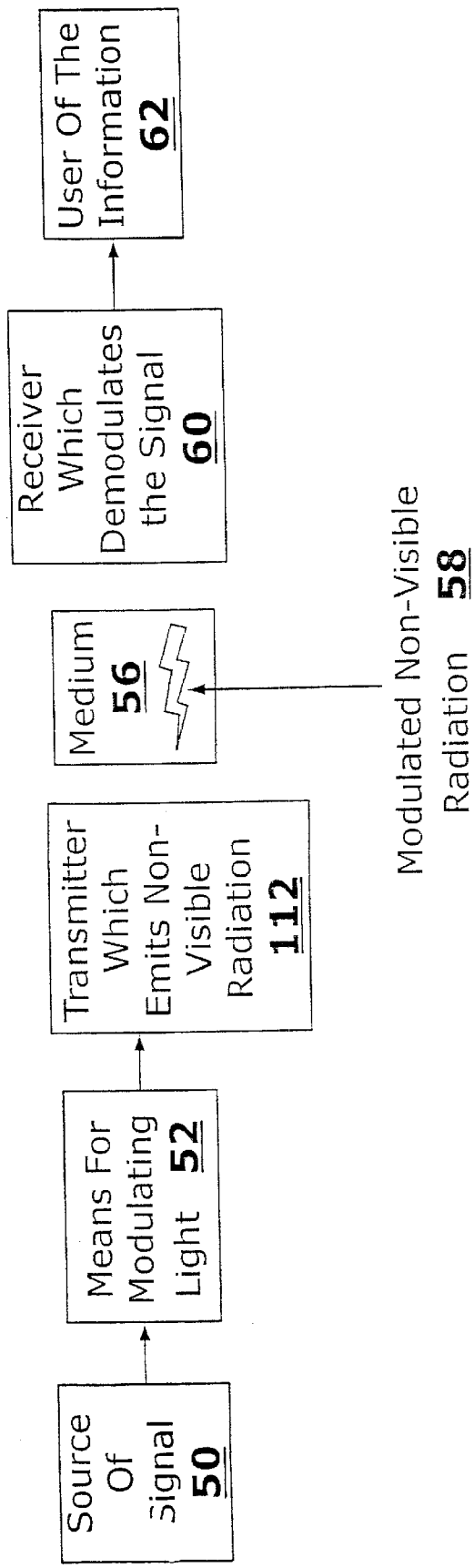
FIG. 6 is a schematic representing the relationship among various elements that may comprise the communication network of the present invention.

When the wavelength range of the electromagnetic radiation used for one or more simultaneous functionally different useful purposes is outside the visible wavelength range, we will refer to that radiation as "non-visible radiation." With reference to FIGS. 3 and 6, it is understood that under some circumstances, a source 50 which is intended to generate electromagnetic radiation outside the visible wavelength range will also generate some visible radiation, such as through transmitter 54. If one or more of the simultaneous useful purposes makes principal use of radiation outside the visible wavelength range, it will be considered "non-visible radiation" notwithstanding the generation of the visible radiation. An example would be a suntanning booth in which the UV light source would be modulated by a means 52 in order to allow communication with the user. Even though the UV light source 50 would simultaneously generate some visible electromagnetic radiation, the useful purpose of tanning the skin would make principal functional use of ultraviolet radiation, so this radiation would qualify as "non-visible radiation." This designation as "non-visible radiation" would pertain whether the modulated UV light is detected by the receiver 60 and used for communication, or the simultaneously generated visible electromagnetic radiation is detected by the receiver and used for communication. Since one useful purpose, namely tanning the skin, makes principal use of electromagnetic radiation outside the visible wavelength range, the radiation qualifies as "non-visible radiation."

In one preferred embodiment of this invention, one useful functional purpose of the embodiment is communication and the other useful functional purpose is some purpose other than communication. In another preferred embodiment, both useful functional purposes of the embodiment are some purpose other than communication.

In one preferred embodiment of the invention, one of the useful functional purposes makes primary use of electromagnetic radiation outside of the visible wavelength range. In another preferred embodiment of the invention, two or more of the useful functional purposes make primary use of electromagnetic radiation outside of the visible wavelength range.

An essential part of this invention is that the electromagnetic radiation must be free from application unacceptable flicker. Generally, this application unacceptable flicker occurs when variations due to the second utility of the radiation interfere with the first utility or vice versa. An example of application unacceptable flicker for visible radiation would be visually perceptible flicker such that the light is considered unacceptable for illumination. For other examples, such as a radar set, application unacceptable flicker could mean that the flicker would interfere with radar detection.

In the examples below, the exact circuitry and systems can be designed and built by an individual of ordinary skill in the art of electrical engineering using, where appropriate, the unique communication network of our previously filed patent applications identified above.

EXAMPLE 1

Personal Locator and Minder Network

Figure 1:
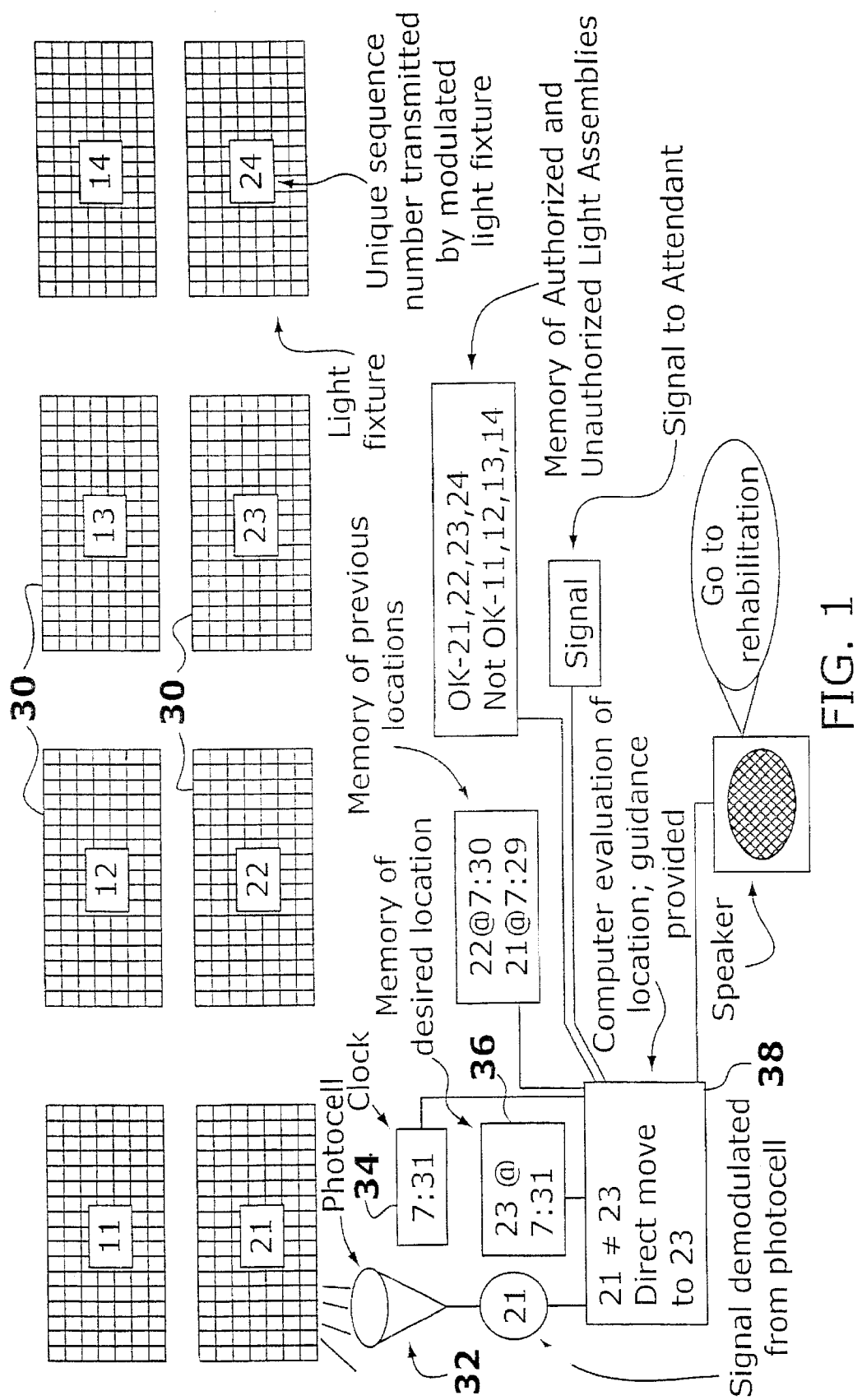
FIG. 1 is a schematic illustration of the invention.

As is shown in FIG. 1, the network is created with a plurality of modulated lights 30, each transmitting its own unique signal. In a preferred embodiment, each modulated light 30 is self contained, except optionally for a power supply, which can be either line power or battery power. The modulated lights are not controlled from a central location.

The PLAM in this example contains a photocell 32 capable of receiving light and circuitry capable of demodulating the signal from the nearest light and identifying the unique signal, a clock 34, a computer memory 36 capable of storing the desired location of the PLAM at any specified time, and a computer 38 capable of evaluating signal received from the photocell 32, comparing that signal with the desired location of the PLAM and presenting information to the user based on the comparison. This information could be reassurance or silence if the signal received is the desired preprogrammed location signal, while it could be guidance or remonstrance if the signal received is not the desired preprogrammed location signal.

Each of a plurality of users can have their own PLAM programmed with their own schedule. Each light will be continuously communicating location. The individual user's PLAM will be reading this location information and then giving the individualized guidance to the user.

PLAM and its enhancements can be valuable to a number of users including brain disabled individuals, such as individuals suffering from traumatic brain injury, Alzheimer's disease or other dementia; children in a child care environment; and individuals in a secure environment whose movements must be monitored and recorded.

EXAMPLE 2

Enhanced Personal Locator and Minder

PLAM is programmed with the planned schedule for the user. When the time for one of the day's scheduled activities is noted by PLAM, the device takes note of the nearest modulated light and compares that with the location where the patient should be. If the light is in the place where the user is scheduled to be, the device simply notes this. However, if the user is in a place other than where he or she is scheduled to be, the device will remind the user of their scheduled location. A more sophisticated version of PLAM will also have in its memory the proper route for the patient to take to proceed to their desired location. As the user would proceed along the path to their desired location, PLAM will take note of the lights which the device is passing and correct the patient if they should take a wrong turn or stop.

EXAMPLE 3

Personal Locator and Minder with Alarm

The PLAM also contains a radio transmitter, microwave transmitter or other transmitter device. If the user of the PLAM is determined by the computer to be in an unauthorized area, this PLAM sends a signal to an attendant. This attendant could be a nurse in a hospital environment, a teacher or day care attendant in a day care environment or a security guard in a secure environment.

EXAMPLE 4

Personalized Voice Messages

In the previous examples, the computer memory of the PLAM is programmed with a voice of personal significance to the user. We define a voice of personal significance to the user to be a voice of a person who has some significant emotional and/or historical tie to the user. Most preferred as voices of personal significance would be the voice of the person themself, or the voices of the person's parents, siblings, children, spouse, business partners, or close friends. Other examples of voices of personal significance, not intending to be limiting, would be the person's former spouse(s), school classmates, friends and acquaintances, coworkers, current or former neighbors, and physicians, nurses or other caregivers.

EXAMPLE 5

Enhanced PLAM with Recording Capability

To the PLAM of Example 2 will be the ability to record the daily activities and mobility of a user. In addition to providing and cueing a personal schedule for a user, the PLAM can also record how many warnings or inconsistencies in schedule versus actual location occurred during the course of an arbitrary time interval. This information could be stored in the PLAM and downloaded when convenient by a monitor, such as a skilled care provider, giving a unique and highly detailed record of a user's mobility and awareness at every location and time during a day.

EXAMPLE 6

Programming the PLAM Using Modulated Lighting

To the PLAM of Example 2 will be add the ability to have the programming in the computer changed by information received over the lighting. The programming information is transmitted over light using one of the techniques previously taught. The information is prefaced with a code to indicate to the computer that it is programming information. The programming information so received is then stored in the computer memory and used by the computer in making decisions and in giving guidance to the user.

EXAMPLE 7

Message Selected from Computer Memory

A memory device such as a computer memory, CD, or tape is loaded with a number of messages which can prove useful. Each message is stored in a coded, identifiable location in the memory device. A coded signal is sent over the network indicating which coded location and which message should be played. The coded signal is received, processed by a computer and used to identify and call up the message from the memory. The message from the memory is presented to the user. This message could be an audio message, textual message, graphical message or other message.

EXAMPLE 8

Mixed Message from Computer Memory and Light Carried Message

The devices of Example 7 have an enhanced capability to receive and process more extensive information from the lights. The system has the capability to present information in a mixed fashion. As an example, the system could be cued to present and then present aurally "This is the office of" from the computer memory and then "Mr. Smith" from the light transmitted audio message.

EXAMPLE 9

Encryption Code

A message is encrypted using one of a number of encryption techniques known in the art which require an decryption code. The user is not provided with the decryption code. The computer or other device provided to the user has a receptor circuit which can receive and process encoded signals from the lighting in the area. The ambient lighting is modulated to contain the decryption code. The computer is able to process and decrypt the encrypted message only so long as the receptor circuit is viewing and processing the decryption code.

EXAMPLE 10

Multiple Channels

Figure 4:
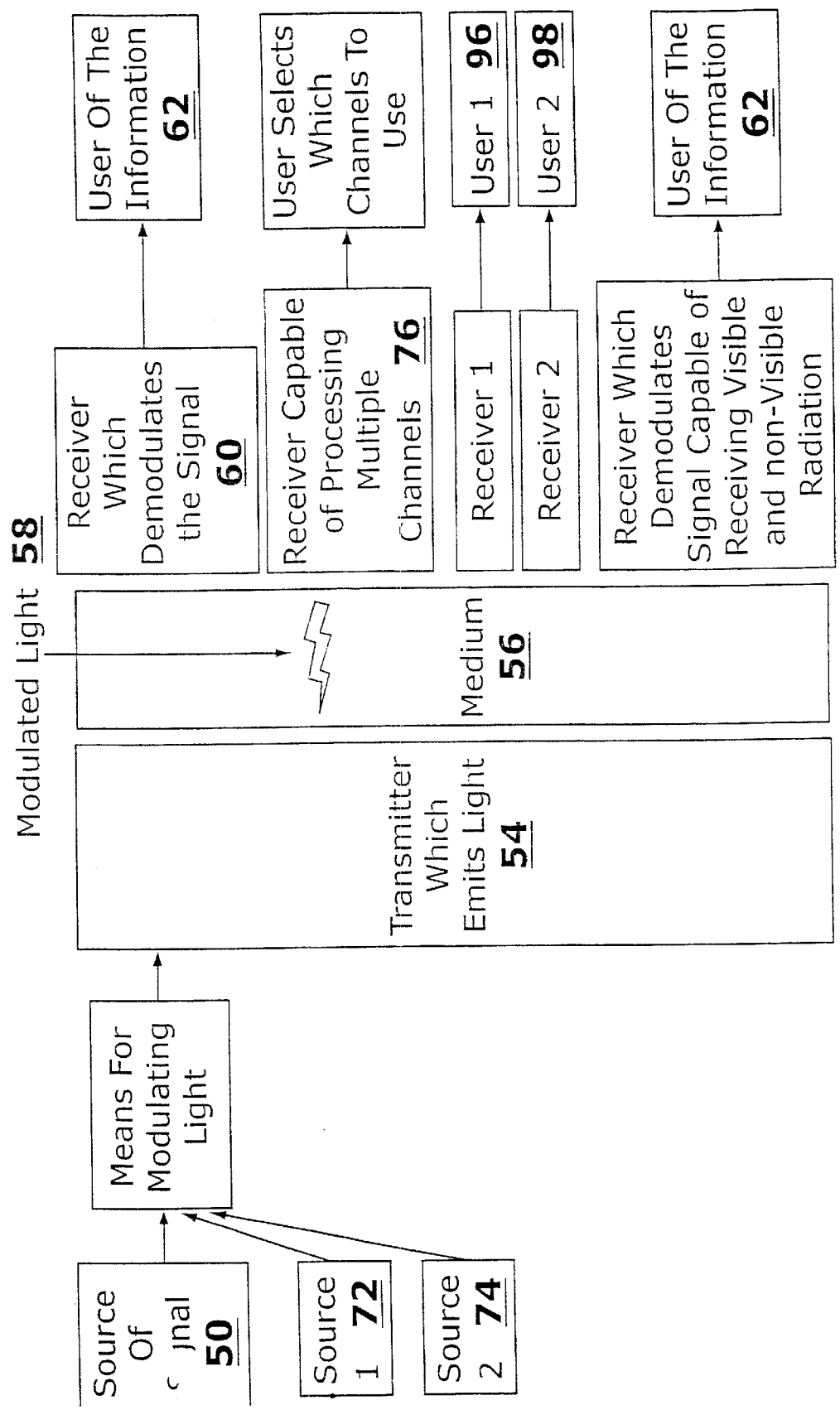
FIG. 4 is a schematic illustrating another embodiment of the communication network of the present invention.
Figure 5:
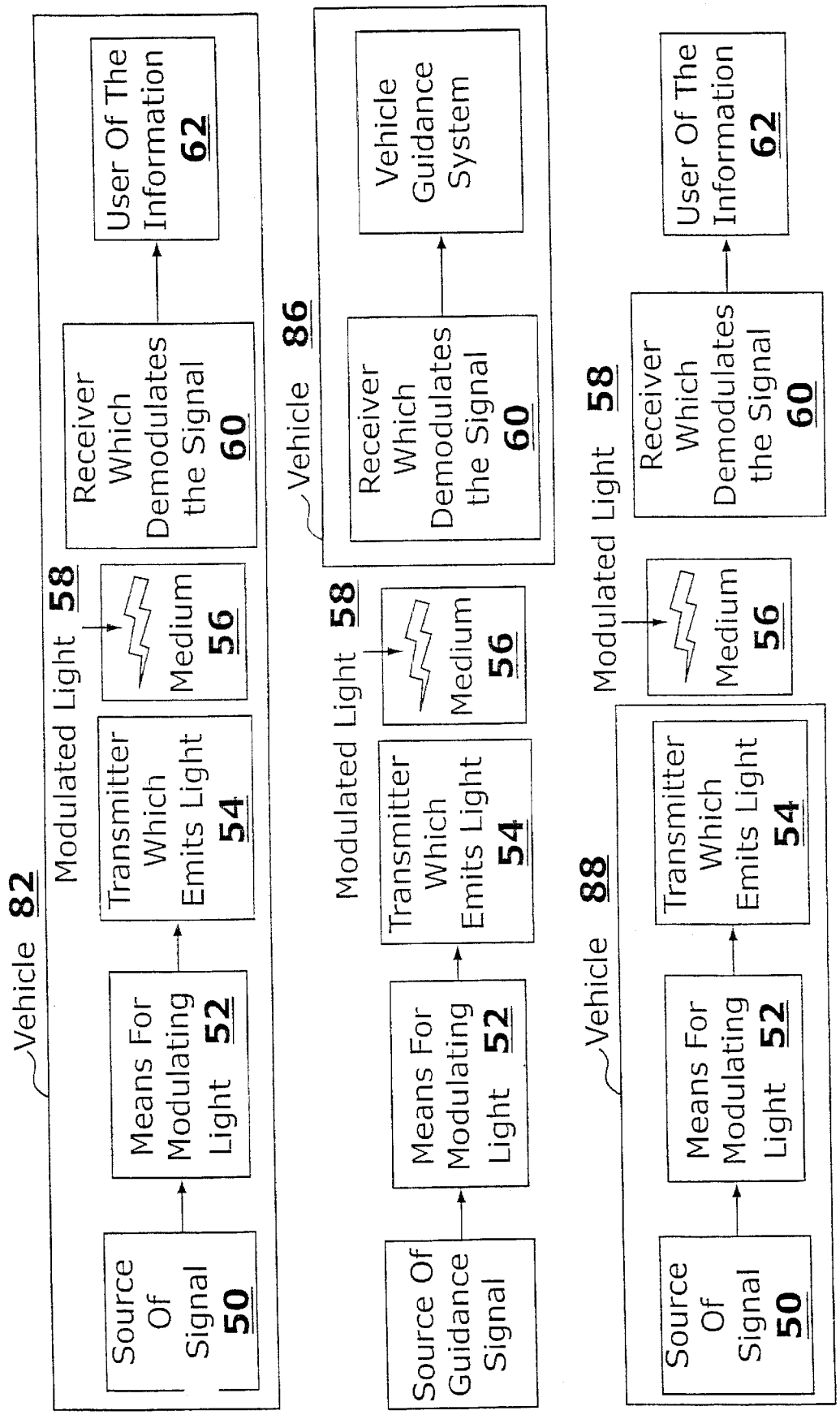
FIG. 5 is a schematic illustrating how the communication network of the present invention may be used in connection with a vehicle.

With reference to FIG. 4, a network is constructed with two or more lights 72, 74 in proximity transmitting information on two or more different frequencies or else with one or more lights each transmitting information on two or more different frequencies creating channels of information. A receiver 76 is provided which is able to receive and process information from these channels. Different information is transmitted on the different channels, which may be received by different users 96, 98.

EXAMPLE 11

Multiple Channels to Transmit Different Languages

In the network of Example 10, information is transmitted using the different channels to transmit different languages. As an example, one channel could transmit information in English and another channel to transmit the same information in Spanish.

EXAMPLE 12

Lighting to Provide Descriptions of Exhibits

In an facility where there are two or more areas with different items being exhibited, each area is provided with its own separate lighting. This lighting is modulated to provide a description of the exhibit which is being lighted. The user is provided with a receptor which will allow the user to receive a description of the exhibit. As the user moves from one exhibit to another, the lighting provides the appropriate description of the exhibit which they are viewing.

EXAMPLE 13

Assistance to the Visually Impaired

The lights in a facility are modulated to provide guidance information to individuals who are visually impaired. This information could be of the sort of "Office X is on the right" or "The stairs are on the left." A visually impaired individual would have a receptor to process this information and receive the guidance.

EXAMPLE 14

Assistance to the Hearing Impaired—Aural

The lights in a facility are modulated to provide information to individuals who are hard of hearing and require assistance. The information could be provided through a speaker, earphones or through a neck loop into a magnetic induction type hearing aid.

EXAMPLE 15

Assistance to the Hearing Impaired—Textual

The lights in a facility are modulated to provide information to individuals who are deaf or hard of hearing and require assistance. The information could be textual, graphical or pictorial information.

EXAMPLE 16

User which is Moving

The lights in an area are modulated to contain information. A user which is moving is provided with a receiver. Information is transmitted to the user which is moving.

EXAMPLE 17

Lighting Inside a Vehicle

The lighting 58 inside or on a vehicle 82 is modulated to contain information. A user 62 inside or on the vehicle is provided with a receiver 60. Information is transmitted to the user 62 which is inside or on the vehicle. The vehicle can be an aircraft, boat, submarine, bus, auto, tank, other military vehicle, wheelchair, spacecraft or other vehicle. The vehicle can be moving or stationary.

EXAMPLE 18

Guidance and Directional Information to a Vehicle

Figure 2:
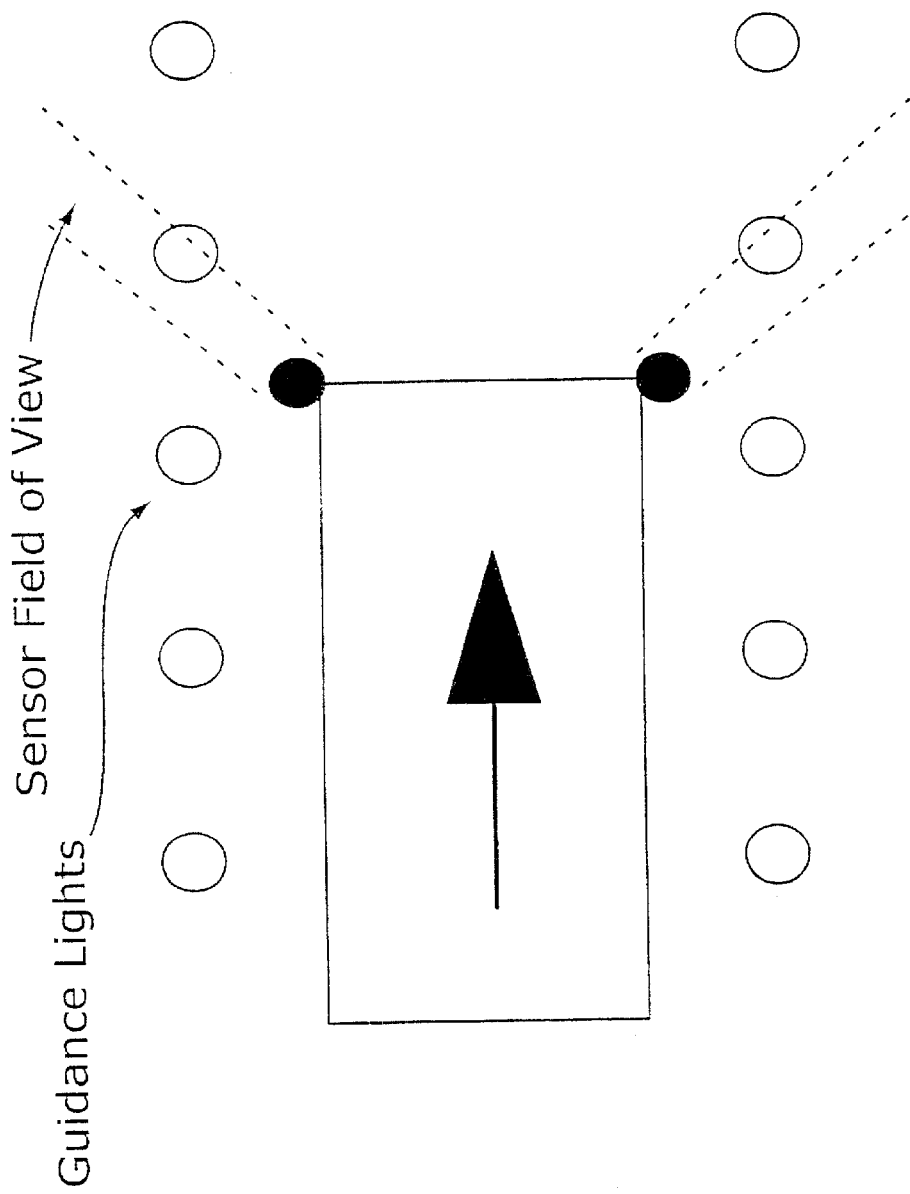
FIG. 2 is a schematic illustration of a guidance embodiment of the invention.

Lighting 58 outside a vehicle 86 is modulated to provide information. Each light or sequence of lights is modulated to contain directional information or guidance information. The vehicle has sensors which in a sequential form will view the lights. By processing the information from the lights in sequence, and determining which lights are and are not in the field of view of the sensors, the vehicle can maintain its direction of travel. This is shown in the FIG. 2 below.

EXAMPLE 19

Modulated Running Lights

Circuitry is provided to modulate the running lights on a vehicle 88. These lights will carry information generated by a source 50 inside the vehicle 88. A receiver 60 outside the vehicle can receive and process this modulated light and process the information to a user 62 outside the vehicle. Another embodiment of this example would be the modulation of the headlights on a vehicle.

EXAMPLE 19

Repeater Network

One light in a facility is modulated with a signal to carry information. An adjoining light has a receptor which is positioned to view the signal from the first light. This signal is processed by the circuitry in the second light and the signal from the second light is modulated to transmit the same signal as is contained in the modulated signal from the first light. A third light has a receptor which is positioned to view the signal from the second light. This light also has a repeater circuit similar to the second light. A network of lights throughout the facility is, in this manner, modulated to carry the same signal as the first light.

EXAMPLE 20

Transmission Through Fluid

A light is modulated to carry a signal. The electromagnetic radiation from this light is allowed to fall on a receiver/receptor 60 and the signal is processed. Water 90 is placed in the path between the light and the receiver 60. No change is observed in the signal which is processed. The light is carried by a SCUBA diver who is underwater and is using the light for underwater illumination. The receiver is carried by another SCUBA diver who makes use of the information transmitted by the modulated light.

EXAMPLE 21

Transmission Through Vacuum or a Reduced Pressure Medium

A light is modulated to carry a signal. The electromagnetic radiation from this light is allowed to fall on a receiver/receptor and the signal is processed. Air or any other gas is partially or completely removed from the medium between the light and the receiver to a pressure below 0.5 atmospheres. No change is observed in the signal which is processed. The light is carried by an astronaut who is in space and is using the light for illumination. The receiver is carried by another astronaut or by a spacecraft which makes use of the information transmitted by the modulated light.

EXAMPLE 22

Signal Source from Computer Memory Provides Repetitive Signal

A computer memory is programmed to repeat, continuously, an information signal. This information signal is used to control the modulation of a light signal. A receiver receives and processes this information.

EXAMPLE 23

Signal Source Provides Non Repetitive Signal

A non repetitive signal is provided from a microphone, tape, CD, record or other information storage device. This non-repetitive signal is used to control the modulation of a light signal. A receiver receives and processes this information.

EXAMPLE 24

Lecture Hall

A network is created in a facility where two or more users are present. The users each have individual receivers and make personal use of the information transmitted by the lights.

EXAMPLE 25

Non-visible Radiation—Ultraviolet

A mercury vapor lamp capable of producing ultraviolet radiation which can tan the skin modulated to carry information. A receiver of the type taught in the co-pending application above is able to detect the fraction of the radiation in visible range, demodulate it and extract the transmitted signal. Alternately, a photodetector capable of detecting ultraviolet radiation is used and the modulated ultraviolet radiation is detected, demodulated and the transmitted signal extracted and presented to the user. The ultraviolet light is also used for tanning the skin of the user.

EXAMPLE 26

Non-visible Radiation—Infrared

An infrared illuminator is used to provide illumination for a viewing device which can receive infrared radiation and present it to a user as a visible display. This infrared illuminator is modulated to carry an analog audio signal. A receptor of the type taught in the co-pending application above is provided to receive and process this analog audio signal.

EXAMPLE 27

Non-visible Radiation—MRI

A user is placed in an MRI device. The device is operated in the normal fashion, using electromagnetic radiation of the proper wavelength to create magnetic resonance. This electromagnetic radiation is also modulated to carry information to allow communication with the user.

EXAMPLE 28

Compressed Data

Data from the signal source 50 is compressed using a compression technique known in the art. Compressed data 104 is transmitted over the network. The data is decompressed after it is received and processed by the receiver 60. The decompressed data is presented to the user 106.

What is claimed is:

1. A communication network comprising:
    a source of data in the form of a signal;
    a transmitter that emits visible light capable of providing illumination and electronically detectable variations, the variations resulting from data transmission and being imperceptible by a human eye, the transmitter further providing a means for modulating the light and signal, the modulation means being selected from the group consisting of analog FM, discrete pulse code FM with two level coding, and any other FM orthogonal bit coding scheme;
    a medium through which the light passes;
    a receiver for receiving the light and demodulating the signal to translate the data; and
    a user for the data.

2. The network of claim 1 in which the data is repetitive and the source of the data provides the data in a repetitive fashion.

3. The network of claim 1 in which the data is non-repetitive and the source of the data provides the data in a non-repetitive fashion.

4. The network of claim 1 in which the user comprises a user of encrypted data and the data being transmitted comprises a decryption code for said encrypted data.

5. The network of claim 1 in which multiple channels of data are transmitted simultaneously over the network.

6. The network of claim 5 in which the multiple channels of data are used to transmit different languages.

7. The network of claim 1 in which the user is visually impaired.

8. The network of claim 7 in which the data comprises way finding information.

9. The network of claim 1 in which the user is hearing impaired.

10. The network of claim 9 in which the information comprises aural information.

11. The network of claim 9 in which the data is selected from the group consisting of textual, graphical and pictorial information.

12. The network of claim 1 in which the user is moving.

13. The network of claim 1 in which the network is installed in a vehicle and the user is inside or on the vehicle.

14. The network of claim 13 in which the vehicle is selected from the group consisting of an aircraft, a boat, a submarine, a bus, an automobile, a motorcycle, a tank, a military vehicle other than a tank, a wheelchair and a spacecraft.

15. The network of claim 1 in which the user is the guidance system of a vehicle and the information being transmitted is guidance or directional information.

16. The network of claim 1 in which the transmitter is moving.

17. The network of claim 1 in which the transmitter is installed on a vehicle and transmits information to a user not in or on the vehicle.

18. The network of claim 1 in which the medium comprises liquid.

19. The network of claim 18 in which said liquid comprises water.

20. The network of claim 1 in which the medium comprises vacuum or gas at a pressure below 0.5 atmospheres.

21. The network of claim 1 further comprising a plurality of receivers and a plurality of users.

22. The network of claim 1 wherein the data transmission has been compressed.

23. The network of claim 1 wherein the receiver comprises a means to receive a signal in two or more wavelength regions.

24. The network of claim 1 wherein the receiver comprises a vibratory signaler.

25. The communication network of claim 1 in which the receiver further comprises the capability to receive and process light in some non-visible wavelength range in addition to the visible wavelength range.

26. A communications network comprising:
    a plurality of visible light assemblies, each capable of transmitting a signal unique to that light assembly, said signal being encoded in the light provided by the visible light assembly by means of visible light modulation;
    electronic circuitry capable of providing the visible light;
    a medium means through which visible light passes and is transmitted;
    a receiver means for receiving and demodulating the light and for identifying and presenting the encoded signal from one of the light assemblies; and
    a computer means for processing the encoded signal and making further decisions based on the signal received
    in which the computer means comprises a memory device having data or other information other than data coding schemes stored in various coded locations and the information transmitted over the network comprises information on which coded locations should be selected and which corresponding data or other information other than data coding schemes stored in those coded locations should be extracted from the memory device.

27. The communication network of claim 26 in which any variations in the visible light transmitted as a result of the modulation are imperceptible by a human eye.

28. The communications network of claim 26 in which the electronic methodology for transmitting said encoded signal comprises frequency modulation.

29. The communication network of claim 26 in which the computer user means then presents an audio message.

30. The communication network of claim 29 in which the audio message is presented to a human user.

31. The communications network of claim 30 in which the audio message is presented in a voice of personal significance to the human user.

32. The communication network of claim 31 in which the voice of personal significance to the user is selected from the voices of the group consisting of the user himself or herself, the user's parents, siblings, children, spouse, business partners, close friends, former spouse(s), school classmates, friends and acquaintances, coworkers, current or former neighbors, physicians, nurses and other caregivers.

33. The communications network of claim 26 in which the user is mentally disabled.

34. The communication network of claim 26 further comprising a clock or other timekeeping device which can provide time information to the computer concerning the date or time of day during which a message is received.

35. The communications network of claim 34 further comprising the computer capability to store information on the sequence of light assemblies viewed by the receiver together with the time at which each light assembly is viewed.

36. The communications network of claim 26 further comprising the computer capability to store information on the sequence of light assemblies viewed by the receiver.

37. The communications network of claim 26 further comprising the capability of storing a list of which light assemblies are authorized or not authorized for the user.

38. The communications network of claim 37 further comprising the capability of deciding that a user is receiving a signal from an unauthorized light assembly and presenting information to the user based on that decision.

39. The communications network of claim 37 further comprising the capability of receiving a reprogramming signal contained in modulated light and changing the stored memory of authorized and unauthorized locations.

40. The communications network of 26 in which additional information is transmitted over the network and the information delivered to the user comprises some information from the memory storage device and some information transmitted over the network.

41. The communications network of claim 26 in which at least one of the visible light assemblies comprises one or more lamps selected from the group consisting of fluorescent lamps, high intensity discharge lamps, light emitting diodes, lasers, cathode ray tubes, particle beam emitters, liquid crystal displays, electroluminescent panels, klystrons, masers, incandescent lamps and gas discharge lamps.

42. The communications network of claim 41 in which at least one of the visible light assemblies comprises one or more incandescent lamps.

43. The communications network of claim 41 in which at least one of the visible light assemblies comprises one or more gas discharge lamps.

44. The communications network of claim 43 in which at least one of the gas discharge lamps comprises a fluorescent lamp.

45. The communications network of claim 43 in which at least one of the gas discharge lamps comprises a high intensity discharge lamp.

46. The communications network of claim 41 in which at least one of the visible light assemblies comprises a light emitting diode.

47. The communications network of claim 41 in which at least one of the visible light assemblies comprises a laser.

48. The communications network of claim 41 in which at least one of the visible light assemblies comprises a cathode ray tube.

49. The communications network of claim 41 in which at least one of the visible light assemblies comprises a particle beam emitter.

50. The communications network of claim 41 in which at least one of the visible light assemblies comprises a liquid crystal display.

51. The communications network of claim 41 in which at least one of the visible light assemblies comprises an electroluminescent panel.

52. The communications network of claim 41 in which at least one of the visible light assemblies comprises a klystron.

53. The communications network of claim 41 in which at least one of the visible light assemblies comprises a maser.

54. The communications network of claim 26 in which at least one of the visible light assemblies has a power output of at least 0.85 milliwatt.

55. The communications network of claim 54 in which at least one of the visible light assemblies has a power output of at least 0.5 milliwatts.

56. The communications network of claim 55 in which at least one of the visible light assemblies has a power output of at least 1 watt.

57. The communication network of claim 26 in which at least one of the visible light assemblies has a power input of at least 13 watts.

58. The communication network of claim 57 in which at least one of the visible light assemblies has a power input of at least 30 watts.

59. The communications network of claim 58 in which at least one of the visible light assemblies has a power input of at least 35 watts.

60. The communication network of claim 59 in which at least one of the visible light assemblies has a power input of at least 40 watts.

61. The communication network of claim 59 in which at least one of the visible light assemblies has a power input of at least 800 watts.

62. The communications network of claim 26 in which additional information is transmitted over the network and the information delivered to the unit comprises some information from the memory storage device and some information transmitted over the network.

63. The communication network of claim 26 in which the receiver further comprises the capability to receive and process light in some non-visible wavelength range in addition to the visible wavelength range.

64. The network of claim 26 wherein the receiver comprises a means to receive a signal in two or more wavelength regions.

65. A communications network comprising:
- a source of data in the form of a signal;
- a transmitter that emits light and includes a means for modulating the light to effect data transmission, any variations in the light as a result of the modulation being imperceptible by a human eye;
- a medium through which the light passes;
- a receiver for receiving the light and demodulating the signal to obtain information; and
- a user for the informations a memory device having data or other information other than data coding schemes stored in various coded locations and the information transmitted over the network comprises information on which coded locations should be selected an which corresponding data or other information other than data coding schemes stored in those coded locations should be extracted from the memory device.

66. The communications network of claim 65 in which additional information is transmitted over the network and the information delivered to the user comprises some information from the memory storage device and some information transmitted over the network.

* * * * *

UNITED STATES PATENT AND TRADEMARK OFFICE
CERTIFICATE OF CORRECTION

| | |
|---|---|
| PATENT NO. | : 6,400,482 B1 |
| APPLICATION NO. | : 09/291709 |
| DATED | : June 4, 2002 |
| INVENTOR(S) | : Elmer C. Lupton et al. |

Page 1 of 1

It is certified that error appears in the above-identified patent and that said Letters Patent is hereby corrected as shown below:

Col. 1, lines 3-4, after the title insert the following text:

This invention was made with government support under grants 1R43DC04015 awarded by the National Institutes of Health and other U.S. Government grants and contracts. The government has certain rights in the invention.

Signed and Sealed this

Sixteenth Day of December, 2008

JON W. DUDAS
*Director of the United States Patent and Trademark Office*